United States Patent
Goyal et al.

(10) Patent No.: US 10,912,146 B2
(45) Date of Patent: Feb. 2, 2021

(54) PERFORMING A RELIABLE BROADCAST TO A PLURALITY OF NODES

(71) Applicant: QUALCOMM Incorporated, San Diego, CA (US)

(72) Inventors: Giriraj Goyal, Bangalore (IN); Ravi Shekhar, Thubarahalli (IN); Vishal Agarwal, Ramnagar (IN); Srivathsa Sridhara, Bhadravathi (IN)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 15/712,720

(22) Filed: Sep. 22, 2017

(65) Prior Publication Data
US 2019/0098673 A1 Mar. 28, 2019

(51) Int. Cl.
*H04L 12/18* (2006.01)
*H04L 12/911* (2013.01)
(Continued)

(52) U.S. Cl.
CPC ......... *H04W 76/40* (2018.02); *H04L 12/1863* (2013.01); *H04L 12/1877* (2013.01); *H04L 65/4076* (2013.01); *H04W 4/70* (2018.02); *H04W 8/005* (2013.01); *H04L 47/828* (2013.01); *H04W 4/06* (2013.01)

(58) Field of Classification Search
None
See application file for complete search history.

(56) References Cited

U.S. PATENT DOCUMENTS 9,204,390 B2 12/2015 Jo et al.
9,438,436 B2 9/2016 Casati et al.
(Continued)

OTHER PUBLICATIONS

Kalpana G., et al., "Reliable Broadcasting Using Efficient Forward Node Selection for Mobile Ad-Hoc Networks", The International Arab Journal of Information Technology, vol. 9, No. 4, Jul. 2012, pp. 299-305.

(Continued)

*Primary Examiner* — Sai Aung
*Assistant Examiner* — Liem H. Nguyen
(74) *Attorney, Agent, or Firm* — Muncy, Geissler, Olds & Lowe, P.C./Qualcomm

(57) ABSTRACT

The disclosure relates to performing a reliable broadcast from a source device to a plurality of nodes. In an aspect, a representative node establishes a first wireless communication link with each of one or more non-representative nodes, receives, from each of the one or more non-representative nodes, information indicating an ability of the one or more non-representative nodes to sniff wireless communications, establishes a second wireless communication link with the source device, configures the second wireless link based on the information received from the one or more non-representative nodes, sends control information for the second wireless communication link to each of the one or more non-representative nodes, and receives communications from the source device over the second wireless communication link, wherein the one or more non-representative nodes sniff the communications on the second wireless communication link based on the control information for that link.

42 Claims, 5 Drawing Sheets

(51) Int. Cl.
  *H04L 29/06* (2006.01)
  *H04W 4/06* (2009.01)
  *H04W 4/70* (2018.01)
  *H04W 76/40* (2018.01)
  *H04W 8/00* (2009.01)

(56) References Cited

U.S. PATENT DOCUMENTS

| | | | |
|---|---|---|---|
| 2008/0055068 A1* | 3/2008 | Van Wageningen | H04W 52/10 340/539.3 |
| 2009/0010203 A1* | 1/2009 | Pratt, Jr. | H04L 12/66 370/328 |
| 2013/0089020 A1* | 4/2013 | Hakola | H04L 1/1867 370/312 |
| 2014/0051358 A1* | 2/2014 | Dina | H04L 12/6418 455/41.2 |
| 2014/0146736 A1* | 5/2014 | Kim | H04W 4/08 370/312 |
| 2014/0160946 A1* | 6/2014 | Bodas | H04W 52/242 370/252 |
| 2014/0241354 A1 | 8/2014 | Shuman et al. | |
| 2015/0131475 A1* | 5/2015 | Van Phan | H04W 8/26 370/254 |
| 2015/0296404 A1* | 10/2015 | Sharma | H04W 28/0215 370/230 |
| 2015/0381296 A1* | 12/2015 | Jenq | H04R 5/04 381/2 |
| 2016/0044726 A1* | 2/2016 | Enomoto | H04W 76/14 370/329 |
| 2016/0135042 A1 | 5/2016 | Netto et al. | |
| 2016/0150350 A1 | 5/2016 | Ingale et al. | |
| 2017/0006142 A1 | 1/2017 | Kwon | |
| 2017/0085461 A1 | 3/2017 | Zhou et al. | |
| 2017/0195769 A1* | 7/2017 | Chang | H04R 1/1016 |
| 2018/0176079 A1* | 6/2018 | Teo | H04L 29/08 |

OTHER PUBLICATIONS

International Search Report and Written Opinion—PCT/US2018/048574—ISA/EPO—dated Nov. 6, 2018.

* cited by examiner

PERFORMING A RELIABLE BROADCAST TO A PLURALITY OF NODES

TECHNICAL FIELD

The various aspects described herein generally relate to wireless communications, and in particular, to performing a reliable broadcast to a plurality of nodes.

BACKGROUND

The Internet of Things (IoT) is based on the idea that everyday objects, not just computers and computer networks, can be read, recognized, located, addressed, and otherwise controlled via an IoT communications network (e.g., an ad hoc system or the Internet). A group of IoT devices may form a wireless ad hoc network to provide additional functionality (e.g., a group of individual speakers that collectively provide "surround sound"). A wireless ad hoc network (referred to as a WANET) is a decentralized type of wireless network that does not rely on pre-existing infrastructure, such access points or base stations. Instead, each node communicates directly with other nodes, often using a peer-to-peer (P2P) (also referred to as a machine-to-machine (M2M) or device-to-device (D2D)) communication protocol over a short-range wireless network, such as Bluetooth® (e.g., Bluetooth® Low Energy (BLE), Bluetooth® Long Range (BLR), Bluetooth® Classic), Zig-Bee®, Wireless Universal Serial Bus (USB), Z-Wave®, IEEE 802.15.4 (15.4), Long-Term Evolution Direct (LTE-D), and the like.

In some cases, a single node may broadcast a data stream to the remaining nodes of the ad hoc network. For example, an audio device (e.g., a smartphone, an MP3 player, a compact disc (CD) player, etc.) may broadcast an audio stream to a plurality of IoT speakers to be played by the plurality of IoT speakers. However, such a broadcast may be unreliable because the data flow is uni-directional (from source to target(s)) and as such, there may be no indication of whether or not all the nodes received all of the data. There are protocols to address this drawback, such as repeated broadcasts, relay retransmissions (i.e., the transmission of packets from one target node to another target node), acknowledgment (ACK) mechanisms, or P2P transmission to all the nodes in the ad hoc network. However, such methods suffer from both network and energy inefficiencies.

Accordingly, there exists a need to develop devices, apparatus, and methods to improve broadcasting in a wireless ad hoc network.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of performing a reliable broadcast from a source device to a plurality of nodes includes establishing, by a representative node of the plurality of nodes, a first wireless communication link with each of one or more non-representative nodes of the plurality of nodes, receiving, at the representative node from each of the one or more non-representative nodes over the corresponding first wireless communication link, information indicating an ability of the one or more non-representative nodes to sniff wireless communications, establishing, by the representative node, a second wireless communication link with the source device configuring, by the representative node, the second wireless link based on the information received from the one or more non-representative nodes, sending, by the representative node, control information for the second wireless communication link to each of the one or more non-representative nodes over the corresponding first wireless communication link, and receiving, at the representative node, communications from the source device over the second wireless communication link, wherein the one or more non-representative nodes receive the communications from the source device by sniffing the second wireless communication link based on the control information for the second wireless communication link.

In an aspect, an apparatus for performing a reliable broadcast from a source device to a plurality of nodes includes a transceiver of a representative node of the plurality of nodes, and at least one processor of the representative node coupled to the transceiver, the at least one processor configured to: establish a first wireless communication link with each of one or more non-representative nodes of the plurality of nodes, receive, from each of the one or more non-representative nodes over the corresponding first wireless communication link, information indicating an ability of the one or more non-representative nodes to sniff wireless communications, establish a second wireless communication link with the source device, configure the second wireless link based on the information received from the one or more non-representative nodes, send control information for the second wireless communication link to each of the one or more non-representative nodes over the corresponding first wireless communication link, and receive communications from the source device over the second wireless communication link, wherein the one or more non-representative nodes receive the communications from the source device by sniffing the second wireless communication link based on the control information for the second wireless communication link.

In an aspect, a non-transitory computer-readable medium storing computer-executable instructions for performing a reliable broadcast from a source device to a plurality of nodes includes computer-executable instructions comprising: at least one instruction instructing a representative node of the plurality of nodes to establish a first wireless communication link with each of one or more non-representative nodes of the plurality of nodes, at least one instruction instructing the representative node to receive, from each of the one or more non-representative nodes over the corresponding first wireless communication link, information indicating an ability of the one or more non-representative nodes to sniff wireless communications, at least one instruction instructing the representative node to establish a second wireless communication link with the source device, at least one instruction instructing the representative node to configure the second wireless link based on the information received from the one or more non-representative nodes, at least one instruction instructing the representative node to send control information for the second wireless communication link to each of the one or more non-representative nodes over the corresponding first wireless communication link, and at least one instruction instructing the representative node to receive communications from the source device over the second wireless communication link, wherein the one or more non-representative nodes receive the communications from the source device by sniffing the second wireless communication link based on the control information for the second wireless communication link.

In an aspect, an apparatus for performing a reliable broadcast from a source device to a plurality of nodes includes a means for communicating of a representative node of the plurality of nodes, and a means for processing of the representative node coupled to the means for communicating, the means for processing configured to: establish a first wireless communication link with each of one or more non-representative nodes of the plurality of nodes, receive, from each of the one or more non-representative nodes over the corresponding first wireless communication link, information indicating an ability of the one or more non-representative nodes to sniff wireless communications, establish a second wireless communication link with the source device, configure the second wireless link based on the information received from the one or more non-representative nodes, send control information for the second wireless communication link to each of the one or more non-representative nodes over the corresponding first wireless communication link, and receive communications from the source device over the second wireless communication link, wherein the one or more non-representative nodes receive the communications from the source device by sniffing the second wireless communication link based on the control information for the second wireless communication link.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
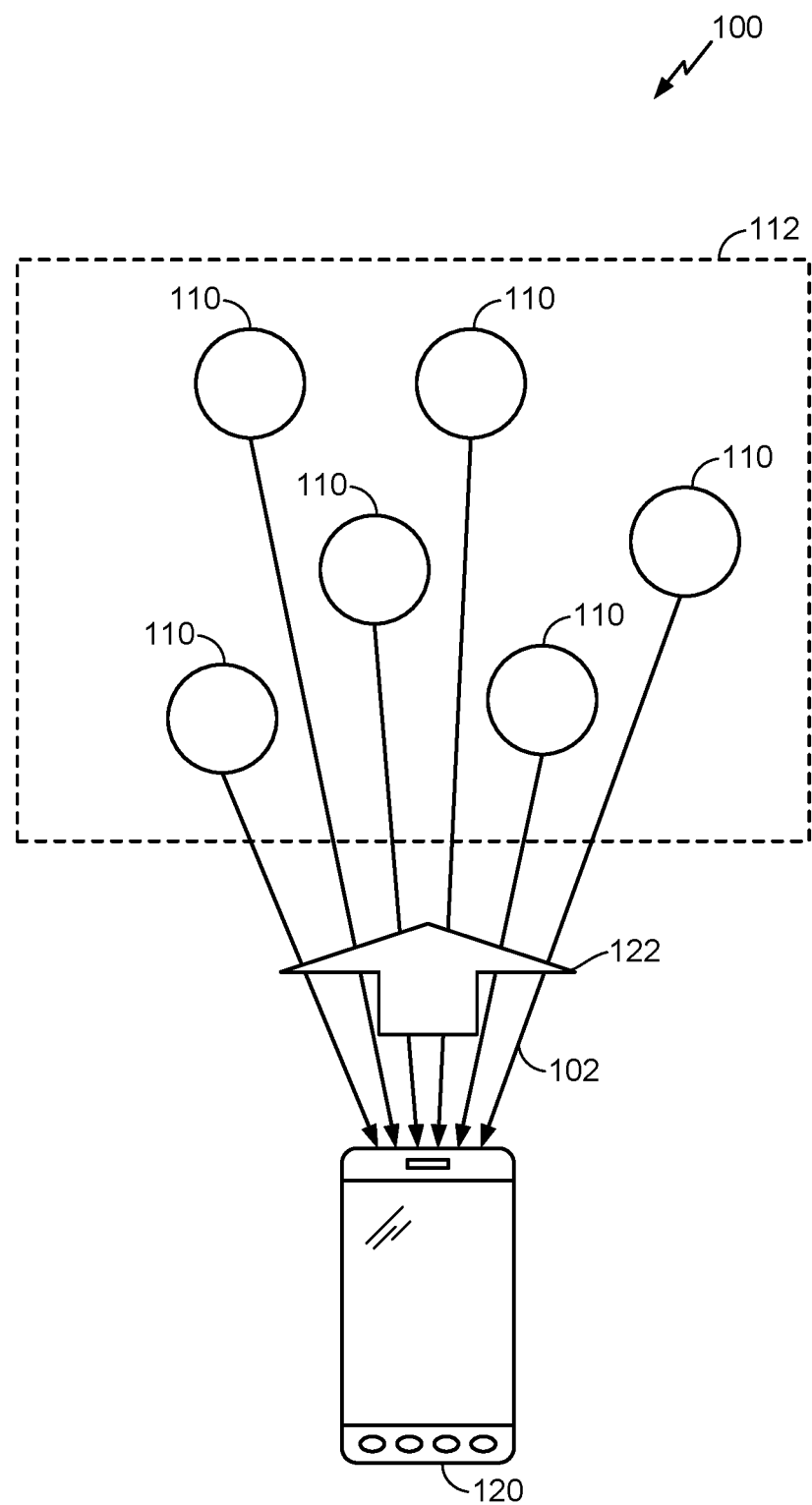
FIG. 1 illustrates an exemplary wireless ad hoc network in which the various aspects described herein may be suitably implemented.

The disclosure generally relates to performing a reliable broadcast from a source device to a plurality of nodes. In an aspect, a representative node of the plurality of nodes establishes a first wireless communication link with each of one or more non-representative nodes of the plurality of nodes, receives, from each of the one or more non-representative nodes over the corresponding first wireless communication link, information indicating an ability of the one or more non-representative nodes to sniff wireless communications, establishes a second wireless communication link with the source device, configures the second wireless link based on the information received from the one or more non-representative nodes, sends control information for the second wireless communication link to each of the one or more non-representative nodes over the corresponding first wireless communication link, and receives communications from the source device over the second wireless communication link, wherein the one or more non-representative nodes receive the communications from the source device by sniffing the second wireless communication link based on the control information for the second wireless communication link.

These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "node," "user device," "user equipment" (or "UE"), "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device. Accordingly, the above-mentioned terms may suitably refer to any one or all of cellular telephones, smart phones, personal or mobile multimedia players, personal data assistants, laptop computers, personal computers, tablet computers, smart books, palm-top computers, wireless electronic mail receivers, multimedia Internet-enabled cellular telephones, wireless gaming controllers, IoT devices, and similar devices with a programmable processor, memory, and circuitry to connect to and communicate over a radio access network (RAN) that implements a particular radio access technology (RAT), over a wireless local area network (WLAN) (e.g., based on IEEE 802.11, etc.), and/or with other devices via a D2D or P2P connection (e.g., a Bluetooth® connection).

FIG. 1 illustrates an exemplary wireless ad hoc network 100 in which the various aspects described herein may be suitably implemented. More particularly, the example wireless ad hoc network 100 may comprise a group or cluster 112 of various proximate (e.g., separated by inches to feet) nodes 110 and a source device 120. In general, the nodes 110 may be the basic building blocks of the wireless ad hoc network 100, wherein the nodes 110 may comprise any suitable device that can be configured to receive and send messages from and to the source node 120. In various aspects, message communication from the source node 120 to the nodes 110 may generally be based on broadcast, or point-to-multipoint, messages, which may be transmitted via one or more wireless channels. For example, the source device 120 may be configured to broadcast data to the nodes 110 over a wireless broadcast communication link 122. Message communication from each node 110 in the cluster 112 to the source node may generally be based on point-to-point messages, which may be transmitted via one or more wireless channels. For example, each node 110 in the cluster 112 may send messages (e.g., acknowledgments (ACKs), negative acknowledgments (NACKs)) to the source node 120 over different wireless point-to-point communication links 102. More specifically, each node 110 may establish its own wireless point-to-point communication links 102 with the source node 120 in order to provide feedback to the source node 120.

The nodes 110 and the source device 120 may be configured to communicate with one another via a wireless communication protocol, such as Bluetooth® (e.g., Bluetooth® Low Energy (BLE), Bluetooth® Long Range (BLR), Bluetooth® Classic), ZigBee®, Wireless Universal Serial Bus (USB), Z-Wave®, IEEE 802.15.4 (15.4), Long-Term Evolution Direct (LTE-D), and the like, which generally enable devices to send, receive, and relay messages to surrounding devices located within radio range, thus forming a wireless ad hoc network. For example, message communication may be based on broadcast messages transmitted and received via one or more wireless channels (e.g., a Bluetooth® broadcast channel). As such, the wireless communication protocol may enable the wireless ad hoc network 100 to be easily extended to accommodate new devices (e.g., new nodes 110). The wireless communication protocol can therefore be used to support various different use cases that are built, at least in part, on point-to-point, point-to-multipoint, and/or other suitable wireless communications.

In an aspect, the source device 120 may broadcast a data stream to the remaining nodes 110 of the wireless ad hoc network 100. For example, the source device 120 may be an audio device (e.g., a smartphone, an MP3 player, a compact disc (CD) player, etc.) and the nodes 110 may be a plurality of IoT speakers that together provide a "surround sound" audio system. As noted above, simply broadcasting a data stream (e.g., over wireless broadcast communication link 122) may be unreliable because the data flow is uni-directional and as such, there may be no indication of whether or not all of the nodes received all of the data. There are protocols to address this drawback, such as repeated broadcasts, relay retransmissions (i.e., the transmission of packets from one target node to another target node), ACK mechanisms (e.g., over wireless point-to-point communication links 102), or P2P transmission to all the nodes in the wireless ad hoc network 100. However, such methods suffer from both network and energy inefficiencies.

Accordingly, the present disclosure provides a mechanism for the reliable broadcast of data from a source device (e.g., the source device 120) to a cluster of devices (e.g., group 112) without the above-noted inefficiencies.

A cluster of target nodes having a proximity to each other of inches to feet (e.g., in the same room) are likely to have very similar wireless environment conditions (e.g., received signal strength indicator (RSSI), Signal-to-Noise Ratio (SNR), etc.). For example, where a smart phone or media player broadcasts an audio stream to left and right wireless headset speakers, the wireless headset speakers are likely to have essentially the same wireless environment conditions given their close proximity to each other. As another example, a media player may broadcast an audio stream to a plurality of IoT speakers in a room that together provide a "surround sound" audio system within the room. The disclosed broadcast mechanism capitalizes on this observation.

Figure 2:
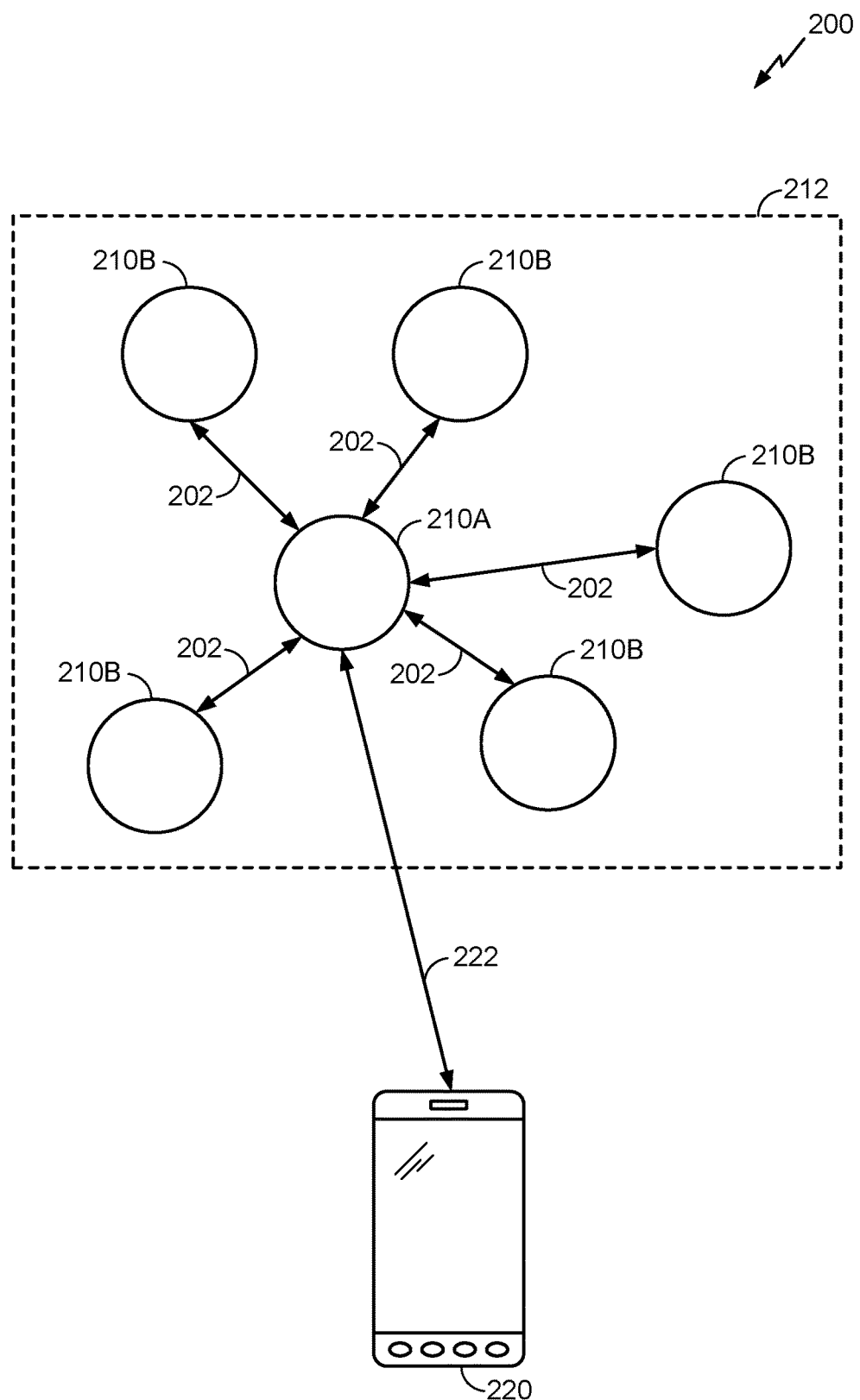
FIG. 2 illustrates an exemplary wireless ad hoc network in which the various aspects described herein may be suitably implemented.

FIG. 2 illustrates an exemplary wireless ad hoc network 200 in which the various aspects described herein may be suitably implemented. Similar to the example wireless ad hoc network 100 in FIG. 1, the wireless ad hoc network 200 includes a group or cluster 212 of various proximate (e.g., separated by inches to feet) target nodes 210A and 210B (collectively referred to as target node(s) 210 or simply node(s) 210) and a source device 220 (which may correspond to nodes 110 and source device 120, respectively, in FIG. 1). For a broadcast from the source device 220 to the cluster 212 of proximate target nodes 210, a representative node 210A can be selected and can establish a reliable wireless point-to-point communication link 222 with the source device 220. Note that either the representative node 210A or the source device 220 can initiate establishment of the wireless point-to-point communication link 222, but they both perform operations to establish the wireless point-to-point communication link 222, as is known in the art. In an aspect, the wireless point-to-point communication link 222 may be a reliable (low-energy) secure encrypted wireless point-to-point communication link, such as a Basic Rate (BR)/Enhanced Data Rate (EDR) Advanced Audio Distribution Profile (A2DP) Bluetooth® link. Then, instead of the source device 220 broadcasting to all of the nodes 210 in the cluster 212 (as over the wireless broadcast communication link 122 in FIG. 1), the source device 220 transmits the data that would have been broadcasted to all of the nodes 210 to only the representative node 210A over the wireless point-to-point communication link 222.

When establishing the wireless point-to-point communication link 222, the representative node 210A tunes its receiver sensitivity to be representative of the receiver sensitivities of the remaining, or non-representative, nodes 210B in the cluster 212. The representative node 210A may also direct the source device 220 to adjust its transmitter power such that all nodes 210 in the cluster 212 will be able to reliably receive/sniff any data transmitted by the source device 220. Initially, the representative node 210A may simply tune its receiver sensitivity as appropriate for itself and then, based on subsequently received feedback from the non-representative nodes 210B (as described further below), tune its receiver sensitivity to be representative of the receiver sensitivities of the non-representative nodes 210B. Similarly, the representative node 210A may initially direct the source device 220 to adjust its transmitter power as appropriate for the representative node 210A and then, based on the feedback from the non-representative nodes 210B, direct the source device 220 to adjust its transmitter power such that all nodes 210 in the cluster 212 will be able to reliably receive any data transmitted by the source device 220.

Once the wireless point-to-point communication link 222 has been established, the representative node 210A sends control information for the wireless point-to-point communication link 222 to the remaining nodes 210B. In that way, when the source device 220 transmits data to the representative node 210A over the wireless point-to-point communication link 222, the remaining nodes 210B are able to "sniff" the wireless point-to-point communication link 222 and decode the data sent to the representative node 210A. In that way, all of the target nodes 210 in the cluster 212 will reliably receive the data transmitted to the representative node 210A over the wireless point-to-point communication link 222 that would have otherwise been broadcasted to all of the nodes 210. Only the representative node 210A ACKs the transmitted data or otherwise communicates with the source device 220; the non-representative nodes 210B are assumed to have received the transmitted data if the representative node 210A receives it.

To act as the representative node 210A for the cluster 212, the representative node 210A collects information indicating the ability to sniff wireless communications between the representative node 210A and the source device 220 from the non-representative nodes 210B. For example, the representative node 210A may collect the remaining nodes' 210B receiver sensitivities, RSSIs, SNRs, and the like. In an aspect, the representative node 210A may collect this information before establishing the wireless point-to-point communication link 222 with the source device 220, which would enable the representative node 210A to tune its receiver sensitivity, for example, to be representative of all of the nodes 210 in the cluster 212 when establishing the wireless point-to-point communication link 222. Additionally, after the source device 220 starts transmitting over the wireless point-to-point communication link 222 and the non-representative nodes 210B have a chance to "sniff" the wireless point-to-point communication link 222, the non-representative nodes 210B can provide this information to the representative node 210A as feedback on their ability to receive the communications transmitted over the wireless point-to-point communication link 222. The representative node 210A can then adjust its receiver sensitivity, for example, to be representative of all of the nodes 210 in the cluster 212, and/or request the source device 220 to tune its transmitter power to be high enough that any transmitted data will be reliably received/sniffed by all of the nodes 210 in the cluster 212.

The representative node 210A may communicate with each of the non-representative nodes 210B in the cluster 212 over different wireless point-to-point communication links 202 than the wireless point-to-point communication link 222 between the source device 220 and the representative node 210A. For example, the representative node 210A may establish a different (e.g., differently configured) BLE link to each of the non-representative nodes 210B in the cluster 212, and can receive the non-representative nodes 210B receiver sensitivities, RSSIs, SNRs, and the like over these links. Note that either the representative node 210A or the non-representative node 210B can initiate establishment of the wireless point-to-point communication link 202, but they both perform operations to establish the wireless point-to-point communication link 202, as is known in the art.

The representative node 210A also communicates the control information (all of the control information or less than all, depending on the situation) for the wireless point-to-point communication link 222 with the source device 220 to the non-representative nodes 210B over the wireless point-to-point communication links 202, thereby enabling the non-representative nodes 210B to sniff the wireless point-to-point communication link 222. When there are any new control parameters for the wireless point-to-point communication link 222, the representative node 210A does not communicate with the source device 220 over the wireless point-to-point communication link 222 until after it sends the new control parameters for the wireless point-to-point communication link 222 to the non-representative nodes 210B over the wireless point-to-point communication links 202.

The representative node 210A is chosen from among the nodes 210 in the cluster 212. The representative node 210A may be chosen based on battery level (e.g., the node 210 with the highest battery level in the cluster 212), physical location (e.g., a central node 210 in the cluster 212), wireless environment conditions (e.g., the node 210 with the worst wireless environment conditions in the cluster 212), or any combination thereof. Alternatively, the representative node 210A could be chosen randomly, and/or each node 210 in the cluster 212 can take a turn being the representative node 210A. Also, in an aspect, the source device 220 may be a node of the cluster 212, and a node 210 in the cluster 212 may at times act as the source device 220, at other times as the representative node 210A, and at other times as a non-representative node 210B. These changes in roles can be coordinated over the wireless communication link(s) between the source device 220 and the nodes 210 of the cluster 212.

In an aspect, to determine whether the nodes 210 in the cluster 212 are sufficiently proximate to each other to use the broadcast mechanism disclosed herein, the nodes 210 may compare their wireless environment conditions. If the wireless environment conditions are sufficiently similar that a single node 210 would be able to represent each node 210 in the cluster 212, then a representative node 210A is chosen and the broadcast mechanism disclosed herein can be employed. In that way, although nodes 210 that are located within centimeters to meters of each other are most likely to be able to use the broadcast mechanism disclosed herein, nodes 210 that are further apart, but still within wireless communication range of each other, may also be able to use the disclosed broadcast mechanism if the wireless environment conditions are sufficiently similar.

In some cases, although not illustrated, a single node 210 may be able to represent most but not all of the nodes 210 of the cluster 212. For example, one or more of the nodes 210 may be close to an access point for another RAT (e.g., a WiFi access point), which could significantly affect that node's wireless environment conditions. In that case, a representative node 210A could be chosen to represent all of the nodes 210 of the group except one or more outlier node(s) 210, and the outlier node(s) 210 could establish their own wireless point-to-point communication link with the source device 220, or select a different representative node.

As will be appreciated, because only the representative node 210A communicates with the source device 220 over the wireless point-to-point communication link 222 (and therefore only the representative node 210A ACKs the transmissions from the source device 220) and does not relay the transmissions from the source device 220 (but rather, the non-representative nodes 210B "sniff" the transmissions on the wireless point-to-point communication link 222), the proposed mechanism improves both bandwidth and energy use in the wireless ad hoc network 200. Additionally, because the representative node 210A is tuned to receive data over the wireless point-to-point communication link 222 in such a way that it is the most likely node 210 in the cluster 212 to miss a packet, the proposed mechanism provides a reliable way to broadcast to a cluster 212 of proximate (e.g., in the same room) target nodes 210 without the need for repeated transmissions or relay transmissions.

Figure 3:
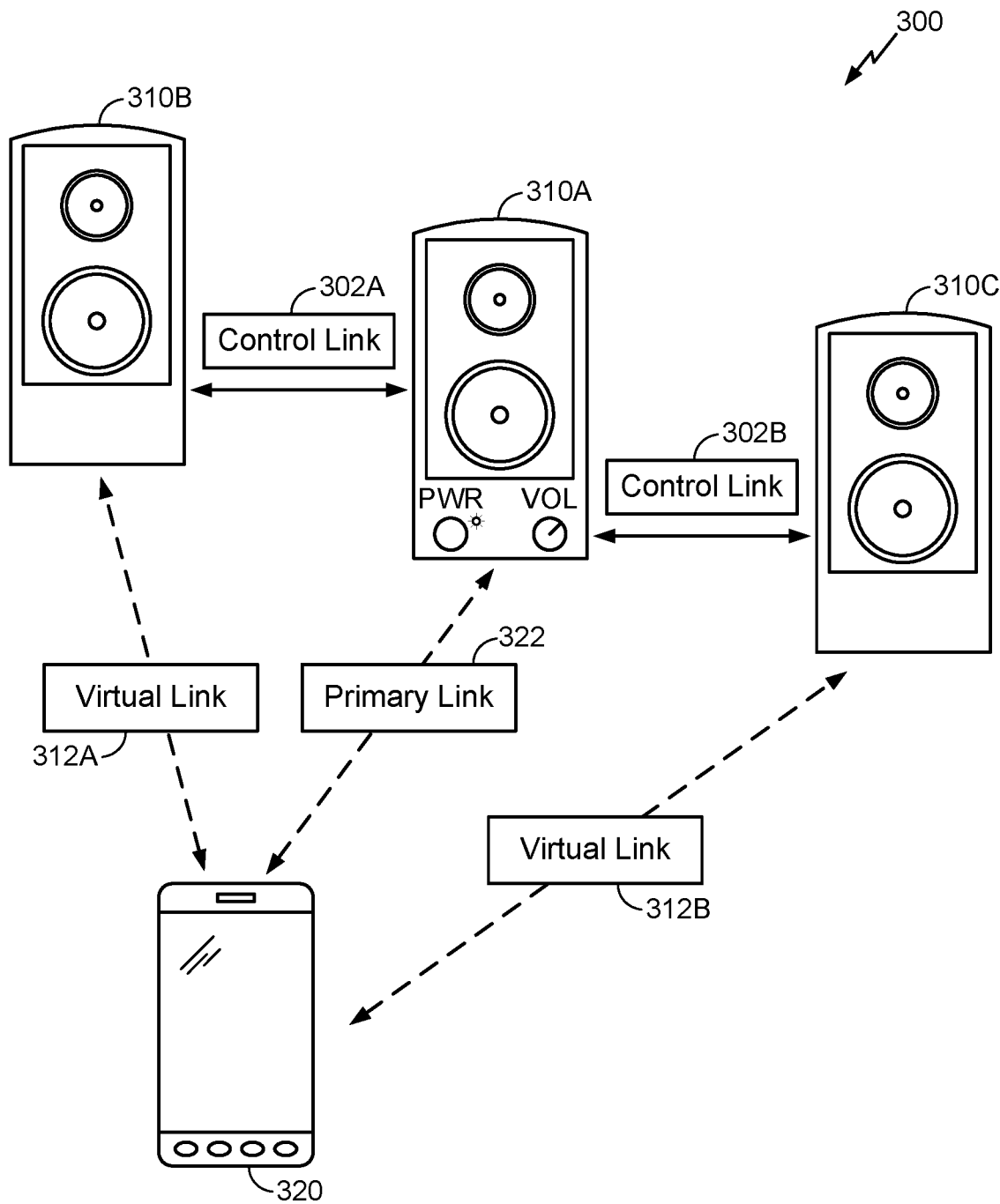
FIG. 3 illustrates a specific example of a wireless ad hoc network in which the various aspects described herein may be suitably implemented.

FIG. 3 illustrates a specific example of a wireless ad hoc network 300 in which the various aspects described herein may be suitably implemented. The wireless ad hoc network 300 includes a source device 320 (which may correspond to the source device 220 in FIG. 2) and a cluster of three target nodes 310A, 310B, and 310C, collectively referred to as target nodes 310, or simply nodes 310, and which may correspond to the representative node 210A and two non-representative nodes 210B in FIG. 2. In the example of FIG. 3, while the source device 320 is illustrated as a smartphone and the target nodes 310 are illustrated as speakers (e.g., of a surround sound system), as will be appreciated, the disclosure is not so limited. In addition, while only three target nodes 310 are illustrated, as will be appreciated, there may be more or fewer than three target nodes 310.

As illustrated in FIG. 3, a control link 302A (which may correspond to the wireless point-to-point communication link 202 in FIG. 2) is established between target nodes 310A and 310B, a control link 302B (which may correspond to the wireless point-to-point communication link 202 in FIG. 2) is established between target nodes 310A and 310C, and a "primary" link 322 (which may correspond to the wireless point-to-point communication link 222 in FIG. 2) is established between the source device 320 and the target node 310A. The target node 310A is the representative node and is referred to as the "primary speaker" or the "primary target node." The control links 302A and 302B may be wireless (low-energy) point-to-point communication links, such as BLE links. The primary link 322 may be a reliable (low-energy) secure encrypted wireless point-to-point communication link, such as a Basic Rate (BR)/Enhanced Data Rate (EDR) Advanced Audio Distribution Profile (A2DP) Bluetooth® link. In the example of FIG. 3, the source device 320 transmits audio data over the primary link 322 to the primary target node 310A.

The primary target node 310A uses the control links 302A and 302B to share the transport information (e.g., frequency hopping spread (FHS), modulation scheme, channel map, etc.), audio information (e.g., codec information, volume, etc.), and the security information (e.g., the encryption key) for the primary link 322 with the "secondary" target nodes 310B and 310C. The shared transport and security information (referred to collectively as the "control" information) enables the secondary target nodes 310B and 310C to listen to and decode (i.e., "sniff") the traffic on the primary link 322. This creates virtual links 312A and 312B between the source device 320 and the secondary target nodes 310B and 310C. For reliability of the virtual links 312A and 312B, the secondary target nodes 310B and 310C use the control links 302A and 302B to inform the primary target node 310A regarding a suitable receiver configuration for the primary target node 310, a suitable configuration for the transmitter of the source device 320, and/or the secondary target nodes' 310B and 310C channel maps, as described further below.

Because the three target nodes 310 are in close proximity to each other (e.g., within inches to feet because, in the example of FIG. 3, they are wireless speakers), as noted above, their wireless environment conditions will likely be very similar. In general, this will make the virtual links 312A and 312B reliable links. That is, either the data from the source device 320 to the primary target node 310A over the primary link 322 and sniffed by the secondary target nodes 310B and 310C will be correctly received by all target nodes 310, or all will miss it.

However, the reliability of the virtual links 312A and 312B can be further increased by taking into account the ability of the secondary target nodes 310B and 310C to sniff wireless communications on the primary link 322. In an aspect, the secondary target nodes 310B and 310C can periodically (i.e., at fixed intervals) share their RSSI and/or SNR values with the primary target node 310A over the control links 302A and 302B. The primary target node 310A can then adjust its receiver sensitivity to ensure that if a packet is missed by either of the secondary target nodes 310B and 310C, it is also highly likely to be missed by the primary target node 310A. The primary target node 310A can also cause the source device 320 to adjust its transmitter power based on the RSSI/SNR of the secondary target nodes 310B and 310C, as well as its own RSSI/SNR.

In an aspect, the secondary target nodes 310B and 310C can also share their channel maps with the primary target node 310A, and the primary target node 310A can consider these channel maps when determining which channel to use when communicating with the source device 320. More specifically, secondary target nodes 310B and 310C can share, with the primary target node 310A, their channel assessment information (represented as channel maps) regarding which channels are suitable for use and which channels are not suitable for use by the secondary target nodes 310B and 310C. The primary target node 310A also performs its own channel assessment to determine which channels are suitable and unsuitable for use by the primary target node 310A. Based on the channel assessment information/channel map from secondary target nodes 310B and 310C and its own channel assessment/channel map, the primary target node 310A can request/command communication with the source device 320 over the channel(s) that are suitable for both the primary target node 310A and the secondary target nodes 310B and 310C. Until a new channel map is effective, the primary target node 310A can optionally choose not to listen on bad frequencies (i.e., unsuitable channels) indicated by the secondary target nodes 310A and 310B, or alternatively, lower its receiver sensitivity further for those frequencies.

In another aspect, to further increase reliability, when a secondary target node 310B or 310C misses a packet but successfully receives the header for the packet, it can transmit a NACK at a higher transmit power to corrupt any ACK from the primary target node 310A to the source device 320. If the secondary target node 310B/310C successfully blocks the ACK from the primary target node 310A, the source device 320 will retransmit the missed packet. If, however, there is no retransmission of the missed packet, the secondary target node 310B/310C can choose to be a silent player (where the data comprises audio data) for that packet.

Generally, it can be assumed that the secondary target nodes 310B and 310C will not be participating in any wireless communication activity other than the activity on the primary link 322 (i.e., sniffing the primary link 322) and the control links 302A and 302B. However, if for some reason (e.g., periodic band scan, periodic trim scan, etc.) a secondary target node 310B and/or 310C cannot listen to/sniff the traffic on the primary link 322, then it can notify the primary target node 310A of its absence over the control link 302A/302B. The secondary target node 310B/310C can notify the primary target node 310A of its absence in advance (e.g., by sending its periodic band scan schedule) or at the time it stops listening to/sniffing the primary link 322. The secondary target node 310B/310C can also inform the primary target node 310A of how long it will not be listening to the primary link 322, or simply notify the primary target node 310A when it starts listening to the primary link 322 again.

In response to the notification from the secondary target node 310B/310C, the primary target node 310A can also stop listening to the primary link 322 until the time at which the secondary target node 310B/310C is scheduled to start listening to the primary link 322 again, or until it receives a notification from the secondary target node 310B/310C that it is again listening to the primary link 322. Where the primary target node 310A ACKs each packet received from the source device 320 over the primary link 322, this will result in the source device 320 automatically retransmitting any packets transmitted during the time that the target nodes 310A and 310B/310C are not listening to the primary link 322 because the primary target node 310A will not have ACKed them. Alternatively, rather than not listening to the primary link 322, the primary target node 310A can send negative acknowledgments (NACKs) to the source device 320 for any data sent over the primary link 322 until the secondary target node 310B/310C begins sniffing the primary link 322 again. This will cause the source device 320 to retransmit the missed packet(s) until the secondary target node 310B/310C begins sniffing the primary link 322 again.

As briefly described above, the primary target node 310A uses the control links 302A and 302B to share the transport information for the primary link 322 with the secondary target nodes 310B and 310C. The transport information for the primary link 322, such as a change in the adaptive frequency hopping (AFH) channel map, modulation scheme, packet type, etc., is important information that the secondary target nodes 310B and 310C should receive, even though it rarely changes. Accordingly, the primary target node 310A should preferably share this information with the secondary target nodes 310B and 310C before any such change becomes effective on the primary link 322.

Some control information, however, such as a packet type change or a maximum slot change, is effective immediately. For such immediate control information changes, the primary target node 310A should immediately (or as soon as possible, e.g., at the first opportunity) inform the secondary target nodes 310B and 310C over the control links 302A and 302B before participating in any further communications with the source device 320 over the primary link 322.

As also briefly described above, the primary target node 310A uses the control links 302A and 302B to share the security information (e.g., the encryption key) for the primary link 322 with the secondary target nodes 310B and 310C. Because the encryption key for the primary link 322 is shared with the secondary target nodes 310B and 310C over the control link 302, the secondary target nodes 310B and 310C will be able to decrypt the traffic on the primary link 322 without issue. However, because there are rare situations in which a secondary target node 310B and/or 310C can miss packets, the secondary target nodes 310B and 310C do not verify the message integrity check (MIC) (where the primary link 322 is a Bluetooth® link).

Figure 4:
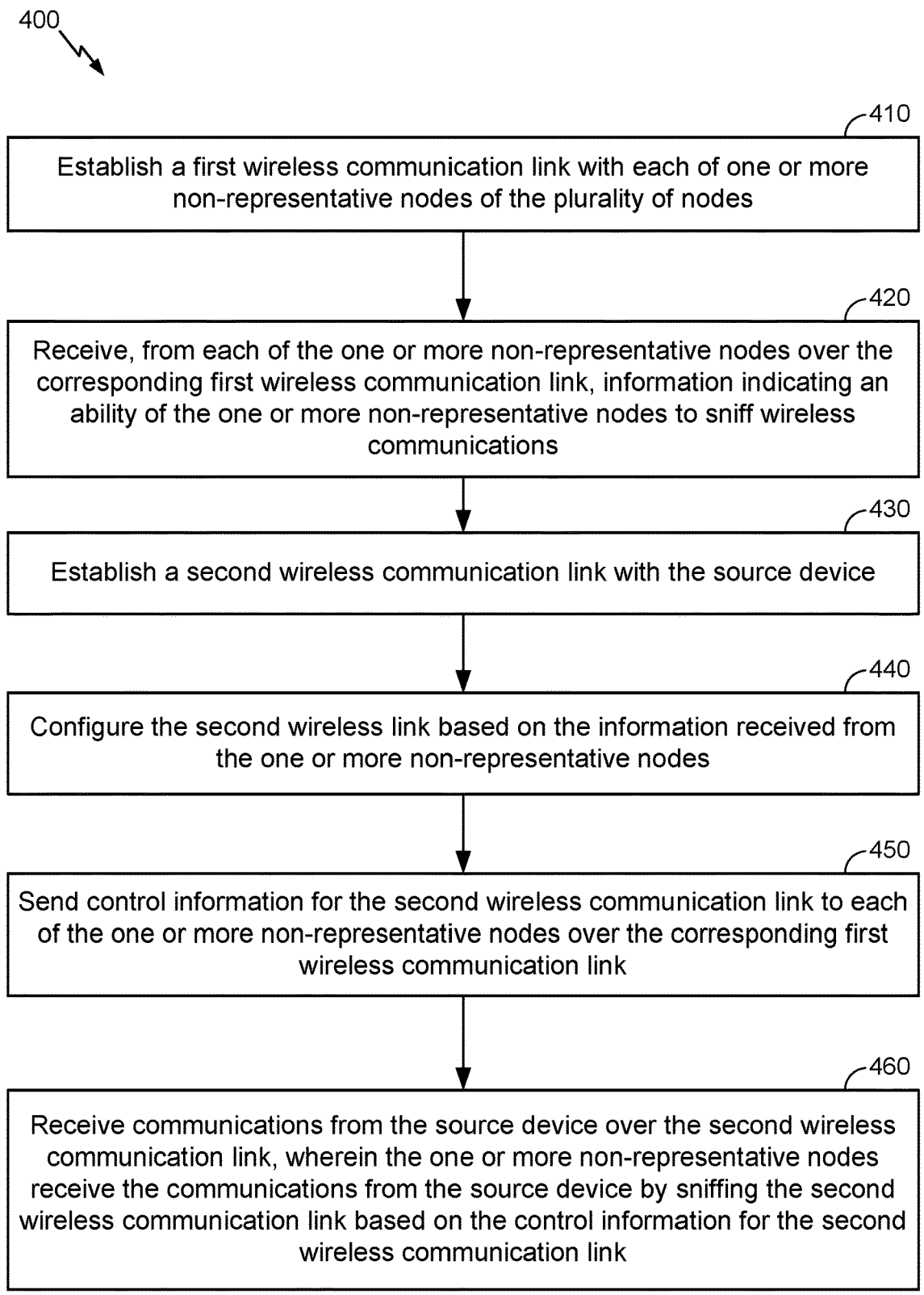
FIG. 4 illustrates an exemplary method for performing a reliable broadcast from a source device to a plurality of nodes according to various aspects of the disclosure.

FIG. 4 illustrates an exemplary method 400 for performing a reliable broadcast from a source device (e.g., source device 220 or 320) to a plurality of nodes (e.g., nodes 210 or 310) according to various aspects of the disclosure. The method 400 may be performed by a representative node (e.g., representative node 210A or 310A) of the plurality of nodes.

At 410, the representative node (e.g., a transceiver/receiver of the representative node) establishes a first wireless communication link (e.g., wireless point-to-point communication link 202 or control link 302A/302B) with each of one or more non- representative nodes (e.g., non-representative nodes 210B or secondary target nodes 310B and/or 310C) of the plurality of nodes (e.g., cluster 212).

At 420, the representative node (e.g., a transceiver/receiver of the representative node) receives, from each of the one or more non-representative nodes over the corresponding first wireless communication link, information indicating an ability of the one or more non-representative nodes to sniff wireless communications. In an aspect, the information received from the one or more non-representative nodes may include a receiver sensitivity of each of the one or more non-representative nodes, an RSSI level of each of the one or more non-representative nodes, a channel map (e.g., AFH channel map) of each of the one or more non-representative nodes, or any combination thereof. In an aspect, the representative node may receive this information before the remaining operations of the method 400, periodically, and/or in response to a change in this information at at least one of the one or more non-representative nodes significant enough to impact that node's ability to sniff wireless communications from the source node.

At 430, the representative node (e.g., a processing system of the representative node in conjunction with the transceiver of the representative node) establishes a second wireless communication link (e.g., wireless point-to-point communication link 222 or primary link 322) with the source device.

At 440, the representative node (e.g., a processing system of the representative node in conjunction with the transceiver of the representative node) configures the second wireless link based on the information received from the one or more non-representative nodes. In an aspect, configuring the second wireless link may include the representative node configuring its transceiver/receiver to be representative of the plurality of nodes based on the information received from the one or more non-representative nodes, and/or requesting the source device to configure its transmitter based on the information received from the one or more non-representative nodes.

At 450, the representative node (e.g., a processing system of the representative node in conjunction with the transceiver/transmitter of the representative node) sends control information for the second wireless communication link to each of the one or more non-representative nodes over the corresponding first wireless communication link.

At 460, the representative node (e.g., a processing system of the representative node and/or the transceiver/receiver of the representative node) receives communications from the source device over the second wireless communication link. In an aspect, the one or more non-representative nodes receive the communications from the source device by sniffing the second wireless communication link based on the control information for the second wireless communication link.

Figure 5:
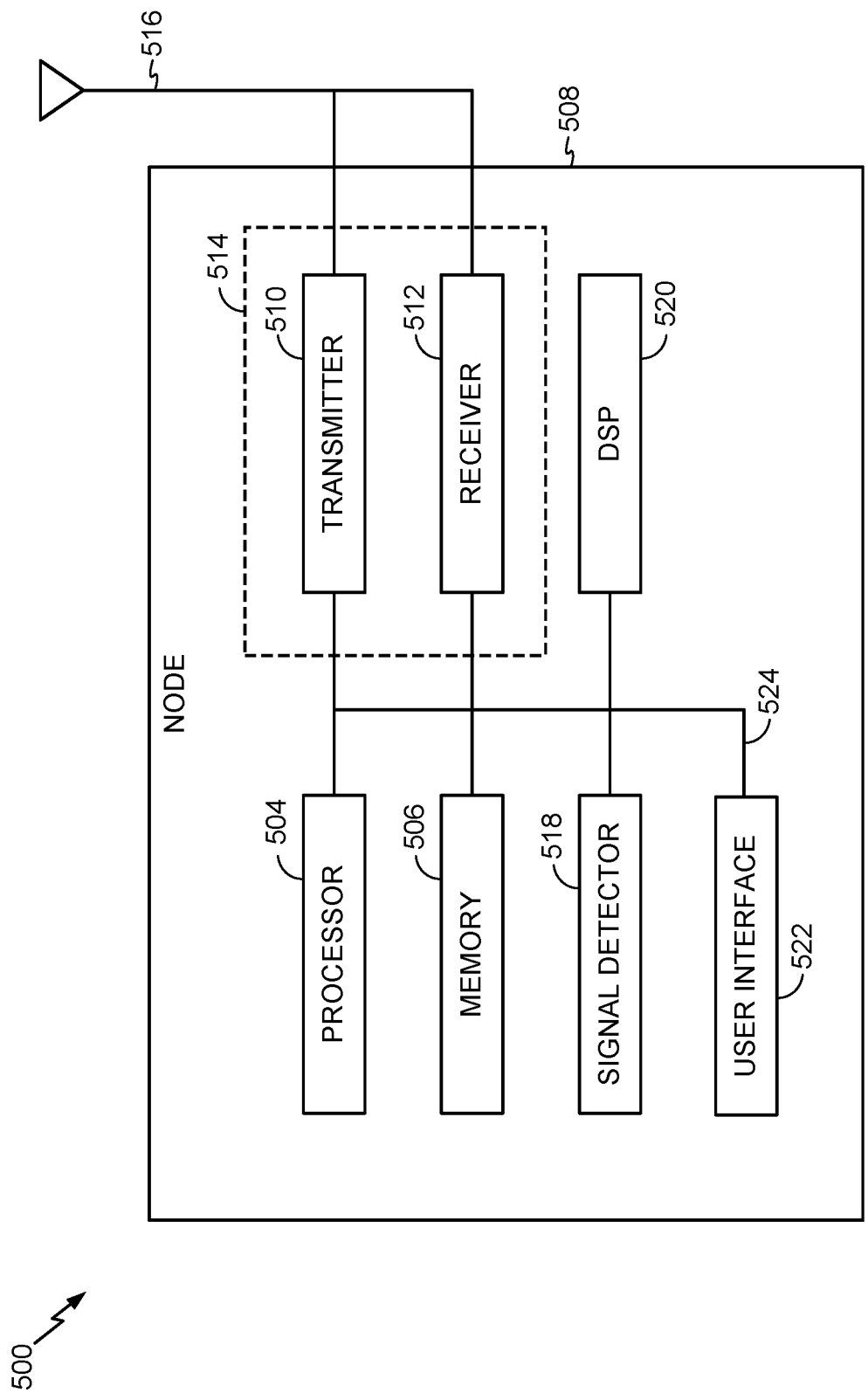
FIG. 5 illustrates an exemplary device configured as a mesh network node in accordance with the various aspects described herein.

FIG. 5 illustrates an exemplary wireless device 500 that can be appropriately configured as a node of a wireless ad hoc network (e.g., wireless ad hoc network 100, 200, and/or 300) in accordance with the various aspects described herein. For example, the wireless device 500 may correspond to a source device (e.g., source device 120, 220, and/or 320), a representative node (e.g., representative node 210A and/or 310A) or a non-representative node (non-representative node 210B and/or 310B) that may be configured to communicate with other nodes in a wireless ad hoc network as described herein.

In various aspects, the wireless device 500 can include a processor 504, a memory 506, a housing 508, a transmitter 510, a receiver 512, an antenna 516, a signal detector 518, a digital signal processor (DSP) 520, a user interface 522, and a bus system 524. Alternatively, the functions of the transmitter 510 and the receiver 512 can be incorporated into a transceiver 514. The wireless device 500 can be configured to communicate in a wireless network that includes, for example, a base station (not illustrated), an access point (not illustrated), or the like.

In various aspects, the processor 504 can be configured to control operations of the wireless device 500. The processor 504 can also be referred to as a central processing unit (CPU). The memory 506 can be coupled to the processor 504, can be in communication with the processor 504, and can provide instructions and data to the processor 504. The processor 504 can perform logical and arithmetic operations based on program instructions stored within the memory 506. The instructions in the memory 506 can be executable to cause the processor 504 and/or the transceiver 514 to perform one or more of the methods and processes described herein, such as the method 400 illustrated in FIG. 4. In various aspects, the processor 504 can include, or be a component of, a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations and/or manipulate information. The processing system can also include machine-readable media for storing software. Software can be construed broadly to mean any type of instructions, whether referred to as software, firmware, middleware, microcode, hardware description language, or otherwise. Instructions can include code, e.g., in source code format, binary code format, executable code format, or any other suitable format of code. The instructions, when executed by the one or more processors, can cause the processing system to perform one or more of the functions described herein.

In various aspects, the memory 506 can include both read-only memory (ROM) and random access memory (RAM). A portion of the memory 506 can also include non-volatile random access memory (NVRAM).

In various aspects, the transmitter 510 and the receiver 512 (or the transceiver 514) can allow transmission and reception of data between the wireless device 500 and a remote location. The antenna 516 can be attached to the housing 508 and be electrically coupled to the transceiver 514. In some implementations, the wireless device 500 can also include multiple transmitters, multiple receivers, multiple transceivers, and/or multiple antennas (not illustrated).

In various aspects, the signal detector 518 can be used to detect and quantify the level of signals received by the transceiver 514. The signal detector 518 can detect such signals as total energy, energy per subcarrier per symbol, and/or power spectral density and in other ways.

In various aspects, the DSP 520 can be used to process signals. The DSP 520 can be configured to generate a packet for transmission. In some aspects, the packet can include a physical layer data unit (PPDU).

In various aspects, the user interface 522 can include, for example, a keypad, a microphone, a speaker, and/or a display. The user interface 522 can include any element or component that conveys information to a user of the wireless device 500 and/or receives input from a user.

In various aspects, the various components of the wireless device 500 can be coupled together by a bus system 524. The bus system 524 can include a data bus, and can also include a power bus, a control signal bus, and/or a status signal bus in addition to the data bus.

In various aspects, the wireless device 500 can also include other components or elements not illustrated in FIG. 5. One or more of the components of the wireless device 500 can be in communication with another one or more components of the wireless device 500 by means of another communication channel (not illustrated) to provide, for example, an input signal to the other component.

Although a number of separate components are illustrated in FIG. 5, one or more of the components can be combined or commonly implemented. For example, the processor 504 and the memory 506 can be embodied on a single chip. The processor 504 can additionally, or in the alternative, contain memory, such as processor registers. Similarly, one or more of the functional blocks or portions of the functionality of various blocks can be embodied on a single chip. Alternatively, the functionality of a particular block can be implemented on two or more chips. For example, the processor 504 can be used to implement not only the functionality described above with respect to the processor 504, but also to implement the functionality described above with respect to the signal detector 518 and/or the DSP 520.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a DSP, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, electrically erasable programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of performing a reliable broadcast from a source device to a plurality of nodes, comprising:
   establishing, by a representative node of the plurality of nodes, a first wireless communication link with each of one or more non-representative nodes of the plurality of nodes;
   receiving, at the representative node from each of the one or more non-representative nodes over the corresponding first wireless communication link, information indicating an ability of the one or more non-representative nodes to sniff wireless communications;
   establishing, by the representative node, a second wireless communication link with the source device;
   configuring, by the representative node, the second wireless communication link based on the information received from the one or more non-representative nodes;
   sending, by the representative node, control information for the second wireless communication link to each of the one or more non-representative nodes over the corresponding first wireless communication link;
   receiving, at the representative node, communications from the source device over the second wireless communication link, wherein the one or more non-representative nodes receive the communications from the source device by sniffing the second wireless communication link based on the control information for the second wireless communication link;
   configuring, by the representative node, a receiver of the representative node to be representative of receivers of the one or more non-representative nodes by tuning a sensitivity of the receiver of the representative node to represent sensitivities of the one or more receivers of the non-representative nodes; and
   directing, by the representative node, the source device to adjust a transmitter power of the source device on the second wireless communication link based on the information received from the one or more non-representative nodes.

2. The method of claim 1, wherein configuring the second wireless communication link comprises:
   requesting, by the representative node, a transmitter configuration of the source device based on the information received from the one or more non-representative nodes.

3. The method of claim 2, wherein configuring the receiver to be representative of the plurality of nodes comprises configuring the receiver so that the representative node is most likely, of the plurality of nodes, to miss a packet of the communications from the source device over the second wireless communication link.

4. The method of claim 1, wherein the information received from the one or more non-representative nodes comprises a receiver sensitivity of each of the one or more non-representative nodes, a received signal strength indicator (RSSI) level of each of the one or more non-representative nodes, a channel map of each of the one or more non-representative nodes, or any combination thereof.

5. The method of claim 1, wherein the representative node receives the information from the one or more non-representative nodes periodically.

6. The method of claim 1, wherein the representative node receives the information from the one or more non-representative nodes before configuring the receiver of the representative node to be representative of the plurality of nodes and establishing the second wireless communication link.

7. The method of claim 1, wherein the representative node receives the information from the one or more non-representative nodes after the source device begins transmitting the communications over the second wireless communication link.

8. The method of claim 1, wherein the representative node receives the information from the one or more non-representative nodes based on a change in the information at the one or more non-representative nodes that effects the ability of the one or more non-representative nodes to sniff wireless communications.

9. The method of claim 1, wherein the control information for the second wireless communication link comprises transport information and security information for the second wireless communication link.

10. The method of claim 9, wherein the transport information comprises a frequency hopping spread (FHS) for the second wireless communication link, a modulation scheme for the second wireless communication link, a channel map for the second wireless communication link, a packet type, or any combination thereof, and the security information comprises an encryption key for the second wireless communication link.

11. The method of claim 1, wherein the first wireless communication link comprises an encrypted low-energy point-to-point wireless communication link.

12. The method of claim 1, wherein the second wireless communication link comprises an encrypted low-energy point-to-point wireless communication link.

13. The method of claim 1, wherein, based on a change in the control information for the second wireless communication link, the representative node sends the changed control information for the second wireless communication link to each of the one or more non-representative nodes over the corresponding first wireless communication link before communicating with the source device using the changed control information for the second wireless communication link.

14. The method of claim 1, further comprising:
receiving, at the representative node, a first notification from at least one of the one or more non-representative nodes indicating that the at least one of the one or more non-representative nodes will not be sniffing the second wireless communication link; and
in response to reception of the first notification, ceasing to listen to the second wireless communication link based on the first notification.

15. The method of claim 14, further comprising:
receiving, at the representative node, a second notification from the at least one of the one or more non-representative nodes indicating that the at least one of the one or more non-representative nodes has resumed sniffing the second wireless communication link; and
in response to reception of the second notification, resuming listening to the second wireless communication link.

16. The method of claim 14, wherein:
the first notification comprises a schedule of time periods during which the at least one of the one or more non-representative nodes will not be sniffing the second wireless communication link, and
the representative node ceases to listen to the second wireless communication link for the time periods during which the at least one of the one or more non-representative nodes will not be sniffing the second wireless communication link.

17. The method of claim 14, wherein:
the first notification indicates that the at least one of the one or more non-representative nodes has stopped sniffing the second wireless communication link, and
the representative node ceases to listen to the second wireless communication link immediately upon reception of the first notification.

18. The method of claim 1, wherein the plurality of nodes are located within a threshold distance of each other.

19. The method of claim 18, wherein the threshold is based on the plurality of nodes having sufficiently similar wireless environment conditions that a single node of the plurality of nodes can act as the representative node.

20. The method of claim 19, wherein the wireless environment conditions comprise a received signal strength indicator (RSSI) and/or a Signal-to-Noise Ratio (SNR) of each of the plurality of nodes.

21. An apparatus for performing a reliable broadcast from a source device to a plurality of nodes, comprising:
a transceiver of a representative node of the plurality of nodes; and
at least one processor of the representative node coupled to the transceiver, the at least one processor configured to:
establish a first wireless communication link with each of one or more non-representative nodes of the plurality of nodes;
receive, from each of the one or more non-representative nodes over the corresponding first wireless communication link, information indicating an ability of the one or more non-representative nodes to sniff wireless communications;
establish a second wireless communication link with the source device;
configure the second wireless communication link based on the information received from the one or more non-representative nodes;
send control information for the second wireless communication link to each of the one or more non-representative nodes over the corresponding first wireless communication link;
receive communications from the source device over the second wireless communication link, wherein the one or more non-representative nodes receive the communications from the source device by sniffing the second wireless communication link based on the control information for the second wireless communication link;
configure a receiver of the representative node to be representative of receivers of the one or more non-representative nodes by tuning a sensitivity of the receiver of the representative node to represent sensitivities of the receivers of the one or more non-representative nodes; and direct the source device to adjust a transmitter power of the source device on the second wireless communication link based on the information received from the one or more non-representative nodes.

22. The apparatus of claim 21, wherein the at least one processor being configured to configure the second wireless communication link comprises the at least one processor being configured to:

request a transmitter configuration of the source device based on the information received from the one or more non-representative nodes.

23. The apparatus of claim 22, wherein the at least one processor being configured to configure the receiver to be representative of the plurality of nodes comprises the at least one processor being configured to configure the receiver so that the representative node is most likely, of the plurality of nodes, to miss a packet of the communications from the source device over the second wireless communication link.

24. The apparatus of claim 21, wherein the information received from the one or more non-representative nodes comprises a receiver sensitivity of each of the one or more non-representative nodes, a received signal strength indicator (RSSI) level of each of the one or more non-representative nodes, a channel map of each of the one or more non-representative nodes, or any combination thereof.

25. The apparatus of claim 21, wherein the representative node receives the information from the one or more non-representative nodes periodically.

26. The apparatus of claim 21, wherein the representative node receives the information from the one or more non-representative nodes before configuring the receiver of the representative node to be representative of the plurality of nodes and establishing the second wireless communication link.

27. The apparatus of claim 21, wherein the representative node receives the information from the one or more non-representative nodes after the source device begins transmitting the communications over the second wireless communication link.

28. The apparatus of claim 21, wherein the representative node receives the information from the one or more non-representative nodes based on a change in the information at the one or more non-representative nodes that effects the ability of the one or more non-representative nodes to sniff wireless communications.

29. The apparatus of claim 21, wherein the control information for the second wireless communication link comprises transport information and security information for the second wireless communication link.

30. The apparatus of claim 29, wherein the transport information comprises a frequency hopping spread (FHS) for the second wireless communication link, a modulation scheme for the second wireless communication link, a channel map for the second wireless communication link, a packet type, or any combination thereof, and the security information comprises an encryption key for the second wireless communication link.

31. The apparatus of claim 21, wherein the first wireless communication link comprises an encrypted low-energy point-to-point wireless communication link.

32. The apparatus of claim 21, wherein the second wireless communication link comprises an encrypted low-energy point-to-point wireless communication link.

33. The apparatus of claim 21, wherein, based on a change in the control information for the second wireless communication link, the representative node sends the changed control information for the second wireless communication link to each of the one or more non-representative nodes over the corresponding first wireless communication link before communicating with the source device using the changed control information for the second wireless communication link.

34. The apparatus of claim 21, wherein:

the transceiver is further configured to receive a first notification from at least one of the one or more non-representative nodes indicating that the at least one of the one or more non-representative nodes will not be sniffing the second wireless communication link, and the at least one processor is further configured to cease, in response to reception of the first notification, to listen to the second wireless communication link based on the first notification.

35. The apparatus of claim 34, wherein:

the transceiver is further configured to receive a second notification from the at least one of the one or more non-representative nodes indicating that the at least one of the one or more non-representative nodes has resumed sniffing the second wireless communication link; and the at least one processor is further configured to resume, in response to reception of the second notification, listening to the second wireless communication link.

36. The apparatus of claim 34, wherein:

the first notification comprises a schedule of time periods during which the at least one of the one or more non-representative nodes will not be sniffing the second wireless communication link, and the representative node ceases to listen to the second wireless communication link for the time periods during which the at least one of the one or more non-representative nodes will not be sniffing the second wireless communication link.

37. The apparatus of claim 34, wherein:

the first notification indicates that the at least one of the one or more non-representative nodes has stopped sniffing the second wireless communication link, and the representative node ceases to listen to the second wireless communication link immediately upon reception of the first notification.

38. The apparatus of claim 21, wherein the plurality of nodes are located within a threshold distance of each other.

39. The apparatus of claim 38, wherein the threshold is based on the plurality of nodes having sufficiently similar wireless environment conditions that a single node of the plurality of nodes can act as the representative node.

40. The apparatus of claim 39, wherein the wireless environment conditions comprise a received signal strength indicator (RSSI) and/or a Signal-to-Noise Ratio (SNR) of each of the plurality of nodes.

41. A non-transitory computer-readable medium storing computer-executable instructions for performing a reliable broadcast from a source device to a plurality of nodes, the computer-executable instructions comprising:

at least one instruction instructing a representative node of the plurality of nodes to establish a first wireless communication link with each of one or more non-representative nodes of the plurality of nodes;

at least one instruction instructing the representative node to receive, from each of the one or more non-representative nodes over the corresponding first wireless communication link, information indicating an ability of the one or more non-representative nodes to sniff wireless communications;

at least one instruction instructing the representative node to establish a second wireless communication link with the source device;

at least one instruction instructing the representative node to configure the second wireless communication link based on the information received from the one or more non-representative nodes;

at least one instruction instructing the representative node to send control information for the second wireless communication link to each of the one or more non-representative nodes over the corresponding first wireless communication link;

at least one instruction instructing the representative node to receive communications from the source device over the second wireless communication link, wherein the one or more non-representative nodes receive the communications from the source device by sniffing the second wireless communication link based on the control information for the second wireless communication link;

at least one instruction instructing the representative node to configure a receiver of the representative node to be representative of receivers of the one or more non-representative nodes by tuning a sensitivity of the receiver of the representative node to represent sensitivities of the receivers of the one or more non-representative nodes; and at least one instruction instructing the representative node to direct the source device to adjust a transmitter power of the source device on the second wireless communication link based on the information received from the one or more non-representative nodes.

42. An apparatus for performing a reliable broadcast from a source device to a plurality of nodes, comprising:

a means for communicating of a representative node of the plurality of nodes; and a means for processing of the representative node coupled to the means for communicating, the means for processing configured to:

establish a first wireless communication link with each of one or more non-representative nodes of the plurality of nodes;

receive, from each of the one or more non-representative nodes over the corresponding first wireless communication link, information indicating an ability of the one or more non-representative nodes to sniff wireless communications;

establish a second wireless communication link with the source device;

configure the second wireless communication link based on the information received from the one or more non-representative nodes;

send control information for the second wireless communication link to each of the one or more non-representative nodes over the corresponding first wireless communication link;

receive communications from the source device over the second wireless communication link, wherein the one or more non-representative nodes receive the communications from the source device by sniffing the second wireless communication link based on the control information for the second wireless communication link;

configure a receiver of the representative node to be representative of receivers of the one or more non-representative nodes by tuning a sensitivity of the receiver of the representative node to represent sensitivities of the receivers of the one or more non-representative nodes; and direct the source device to adjust a transmitter power of the source device on the second wireless communication link based on the information received from the one or more non-representative nodes.

\* \* \* \* \*